(12) United States Patent
Seery

(10) Patent No.: US 11,147,659 B1
(45) Date of Patent: Oct. 19, 2021

(54) DENTAL RETAINER CASING

(71) Applicant: Zachary Seery, Hillsborough, NJ (US)

(72) Inventor: Zachary Seery, Hillsborough, NJ (US)

(*) Notice: Subject to any disclaimer, the term of this patent is extended or adjusted under 35 U.S.C. 154(b) by 16 days.

(21) Appl. No.: 16/835,741

(22) Filed: Mar. 31, 2020

Related U.S. Application Data

(60) Provisional application No. 62/828,004, filed on Apr. 2, 2019.

(51) Int. Cl.
A61C 19/02 (2006.01)
A45D 44/20 (2006.01)
B65D 51/24 (2006.01)
A61C 7/08 (2006.01)

(52) U.S. Cl.
CPC ............ *A61C 19/02* (2013.01); *A45D 44/20* (2013.01); *B65D 51/248* (2013.01); *A61C 7/08* (2013.01)

(58) Field of Classification Search
CPC .......... A45D 44/20; A61C 7/08; A61C 19/02; B65D 51/24; B65D 51/248
USPC ......... 206/63.5; 220/241, 242, 253, 796–804
See application file for complete search history.

(56) References Cited

U.S. PATENT DOCUMENTS

| | | | | |
|---|---|---|---|---|
| 2,328,084 A | * | 8/1943 | Lomax | B65D 43/0218 220/800 |
| 3,610,510 A | * | 10/1971 | Lowry | B65D 21/0234 229/116.2 |
| 3,885,666 A | * | 5/1975 | Maxwell | B44D 3/00 206/1.7 |
| 4,054,220 A | | 10/1977 | Rosenstein | |
| 4,966,319 A | | 10/1990 | Fleming | |
| 4,984,688 A | * | 1/1991 | Mikulin | B65D 77/0433 206/455 |
| 6,261,523 B1 | * | 7/2001 | Schembri | B01L 3/508 220/789 |
| 6,417,761 B1 | * | 7/2002 | Elliott | A61C 7/00 128/859 |
| 6,662,986 B2 | | 12/2003 | Lehtonen | |
| 7,201,271 B1 | * | 4/2007 | Saad | A45C 11/00 132/315 |
| 8,418,852 B2 | | 4/2013 | Ziemba | |
| 8,428,664 B1 | | 4/2013 | Wyers | |
| 8,550,317 B2 | | 10/2013 | Hyseni | |
| 8,746,448 B1 | | 6/2014 | Bellace | |
| 8,989,826 B1 | | 3/2015 | Connolly | |
| 9,259,077 B2 | | 2/2016 | Murphy et al. | |
| 9,407,743 B1 | | 8/2016 | Hirshberg | |
| 9,413,412 B2 | | 8/2016 | Gipson | |
| 9,560,903 B2 | | 2/2017 | Lawson et al. | |

(Continued)

*Primary Examiner* — Bryon P Gehman
(74) *Attorney, Agent, or Firm* — John Rizvi; John Rizvi, P.A.—The Patent Professor®

(57) ABSTRACT

A detachable dental retainer casing is provided including a plurality of receptacles configured to house a dental retainer within an interior space defined by the cooperation of the plurality of receptacles along with an affixed panel mechanism configured to securely attach and remain attached to exterior surfaces. The dental retainer casing provides attachment or integration between the panel and the surface of the component in the wearer's possession in an airtight manner. The dental retainer casing allows a wearer to carry their component with the dental retainer casing safely attached while participating in various activities, without requiring the wearer to dedicate attention to the whereabouts of the dental retainer casing.

20 Claims, 6 Drawing Sheets

(56) References Cited

U.S. PATENT DOCUMENTS

| | | | |
|---|---|---|---|
| 9,671,064 B2 | 6/2017 | Tussy | |
| 9,924,783 B2 | 3/2018 | Widiaman et al. | |
| 9,980,799 B2 * | 5/2018 | Wilson | A61C 7/08 |
| 10,588,728 B2 * | 3/2020 | Wilson | B65D 43/163 |
| 10,595,611 B2 * | 3/2020 | Berkley | A45D 33/008 |
| 10,932,892 B2 * | 3/2021 | Harpring | A61C 19/02 |
| 2005/0277452 A1 | 12/2005 | Pasamba | |
| 2007/0017949 A1 | 1/2007 | Salinas et al. | |
| 2015/0201743 A1 | 7/2015 | Erickson-Davis et al. | |

* cited by examiner

DENTAL RETAINER CASING

CROSS-REFERENCE TO RELATED APPLICATION

This application claims the benefit of United States Non-Provisional Patent Application No. 62/828,004, filed on Apr. 2, 2019, which is incorporated by reference herein in its entirety.

FIELD OF THE INVENTION

The present invention relates generally to dental equipment casings. More particularly, the present invention relates to a dental retainer casing configured to house a dental retainer and capable of being attached to other items or devices such as a cellphone or other electronic device.

BACKGROUND OF THE INVENTION

Historically, dental retainers have been used as an orthodontic treatment intended to shift teeth back to their original position once braces have been removed. Removable retainers may act as a removable support frame for teeth allowing individuals to showcase rectified smiles comprising aligned teeth, without requiring the installation of wiring or lines commonly associated with braces or bonded retainers.

Traditionally, retainers are worn by a population that seeks to keep their teeth aligned worn mostly throughout the night while sleeping, but also throughout the day. Most retainers are configured to be removed from the mouth of the wearer in situations where the wearer needs to clean the retainer or remove it due to discomfort.

Due to the frequency of removal, the potential of sustaining damage, and the difficulty associated with keeping track of their whereabouts, retainers have become a commonly lost or misplaced item that can result in a costly replacement. For example, wearers commonly take their retainer out before eating and set it aside, typically by temporarily storing or placing the retainer in a napkin, which can result in the retainer being accidentally discarded, or in an applicable retainer case which can also become misplaced. In other words, these current methods of temporarily storing or concealing dental retainers have the same probability of getting lost or misplaced as the retainers themselves.

An alternative to the removable retainer is the fixed or bonded retainer, which is a wire that is glued or affixed to the inside or outside surface of the teeth. However, this alternative runs into the issue of the wiring breaking or coming loose resulting in a dentist, orthodontist, or other dental professional having to fix it. Also, the fixed or bonded retainer is rather difficult to clean and maintain resulting in food getting stuck or plaque building up in them.

Accordingly, there remains a need for a safe, convenient and easily trackable casing or container for temporarily storing a removable dental retainer when not in use.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

The present invention is directed to a dental retainer casing configured to simultaneously house a dental retainer in a safe and sanitary method while affixed to a component in a wearer's possession. The dental retainer casing comprises a plurality of receptacles configured to house a dental retainer, and a panel configured to be affixed to a surface of the component in the wearer's possession. The dental retainer casing provides attachment or integration between the panel and the surface of the component in the wearer's possession in an airtight manner. The dental retainer casing allows a wearer to carry their component with the dental retainer casing safely attached while participating in various activities, without requiring the wearer to dedicate attention to the whereabouts of the dental retainer casing.

In a first implementation of the invention, a dental retainer casing comprises a first casing portion and a second casing portion. The first casing portion includes a set of walls defining an inner space configured to receive a dental retainer, and an open end providing access to the inner space. In turn, the second casing portion comprises a cavity configured to at least partially receive the first casing portion. The first and second casing portions are movable relative to one another and configured to selectively adopt a first configuration and a second configuration. In the first configuration, the first and second casing portions are moved away from one another thereby allowing access to the inner space of the first casing portion for insertion or removal of a dental retainer into or from the inner space. In the second configuration, the first and second casing portions are assembled onto one another such that the first casing portion is at least partially received within the cavity of the second casing portion and the open end of the first casing portion is closed by the second casing portion, thereby enclosing the inner space of the first casing portion to house a dental retainer therewithin.

In a second aspect, the cavity of the second casing portion may be configured to receive the first casing portion such that an outer surface of the first casing portion are flush with an outer surface of the second casing portion.

In another aspect, the set of walls of the first casing portion may include a flat sidewall and a curved sidewall extending from opposite ends of the flat sidewall, and further wherein the inner space may be configured to conform to a U-shaped dental retainer.

In another aspect, the cavity of the second casing portion may be defined by a flat sidewall and a curved sidewall, which may be shaped and sized to conform to the flat sidewall and curved sidewall of the first casing portion, respectively.

In another aspect, when the first and second casing portions are arranged in the second configuration, the flat sidewalls of the first and second casing portions may contact one another and the curved sidewalk of the first and second casing portions may also contact one another.

In yet another aspect, the first casing portion in the second configuration may be snugly fitted into the cavity of the second casing portion.

In another aspect, the dental retainer casing may further include a loop attached to and extending from an outer wall of the first casing portion, wherein the outer wall is opposite to the open end.

In another aspect, the first casing portion may further include an affixed panel carrying the loop. The affixed panel may be attached to a remainder of the first casing portion.

In another aspect, the affixed panel may be made of a different material than the remainder of the first casing portion.

In yet another aspect, the dental retainer casing may further include an attachment mechanism configured to secure the first casing portion to the second casing portion in the second configuration.

In another aspect, the attachment mechanism may include a strap configured to extend over and across the first casing portion and attach to the second casing portion in the second configuration.

In another aspect, the first and second casing portions may form a receptacle having a central section and first and second side sections arranged on opposite sides of the central section, wherein the central section may be thicker than the first and second side sections.

In yet another aspect, the dental retainer casing may further include a fastener portion configured to attach the dental retainer casing to a second fastener portion comprised in an electronic device. The central section of the dental retainer casing may be configured to align with a central section of the electronic device to increase a thickness of said central section of the electronic device facilitating gripping of the central section of the electronic device.

In another aspect, the loop may be attached to and extend from an outer wall of the first casing portion at the central section of the dental retainer casing.

In another aspect, the first and second casing portions may form a trapezoidal receptacle when arranged in the second configuration.

In another aspect, the dental retainer casing may further include a fastener portion configured to attach the dental retainer casing to a second fastener portion carried by an external structure, such as, but not limited to, an electronic device.

In yet another aspect, the dental retainer casing may further include at least one aperture configured to align with a functional feature of the electronic device.

These and other objects; features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a dental retainer casing that is capable of safely and sanitarily housing a dental retainer in addition to providing mechanisms to securely attach the dental retainer casing to a surface associated with the wearer in order to successfully and securely maintain possession of the dental retainer.

Figure 1:
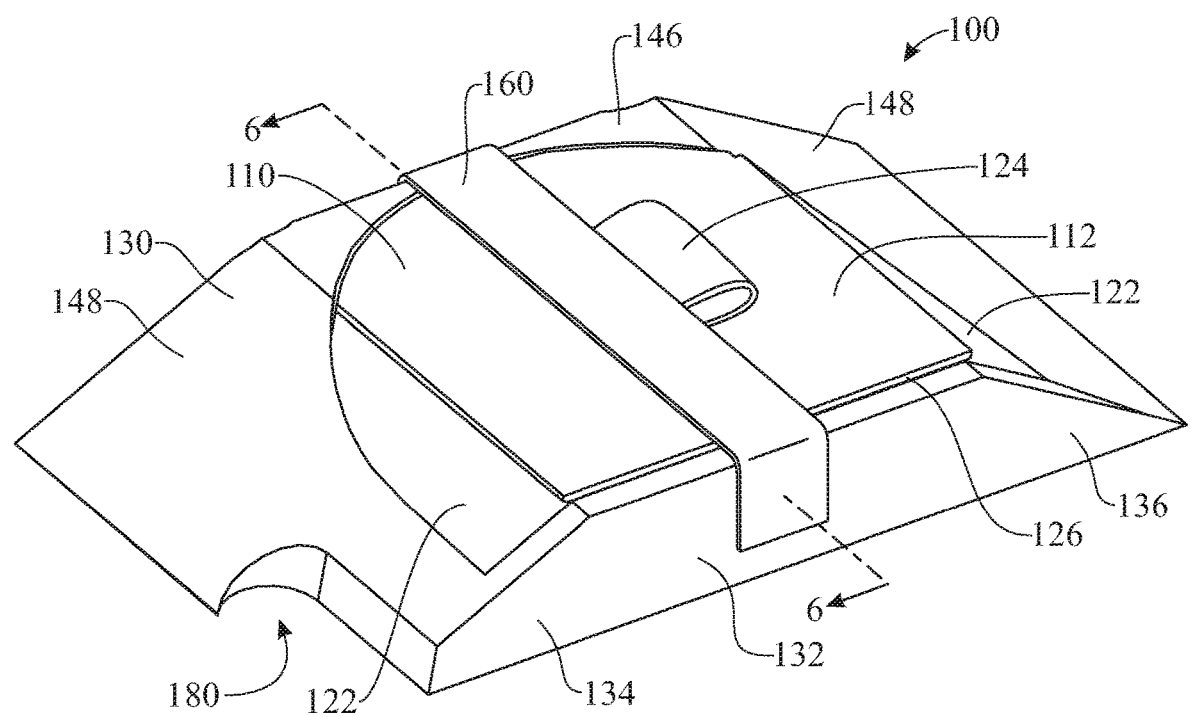
FIG. 1 presents a rear isometric view of a the dental retainer casing in accordance with an illustrative embodiment of the present invention, the dental retainer casing comprising an attachment mechanism shown in the engaged position.
Figure 2:
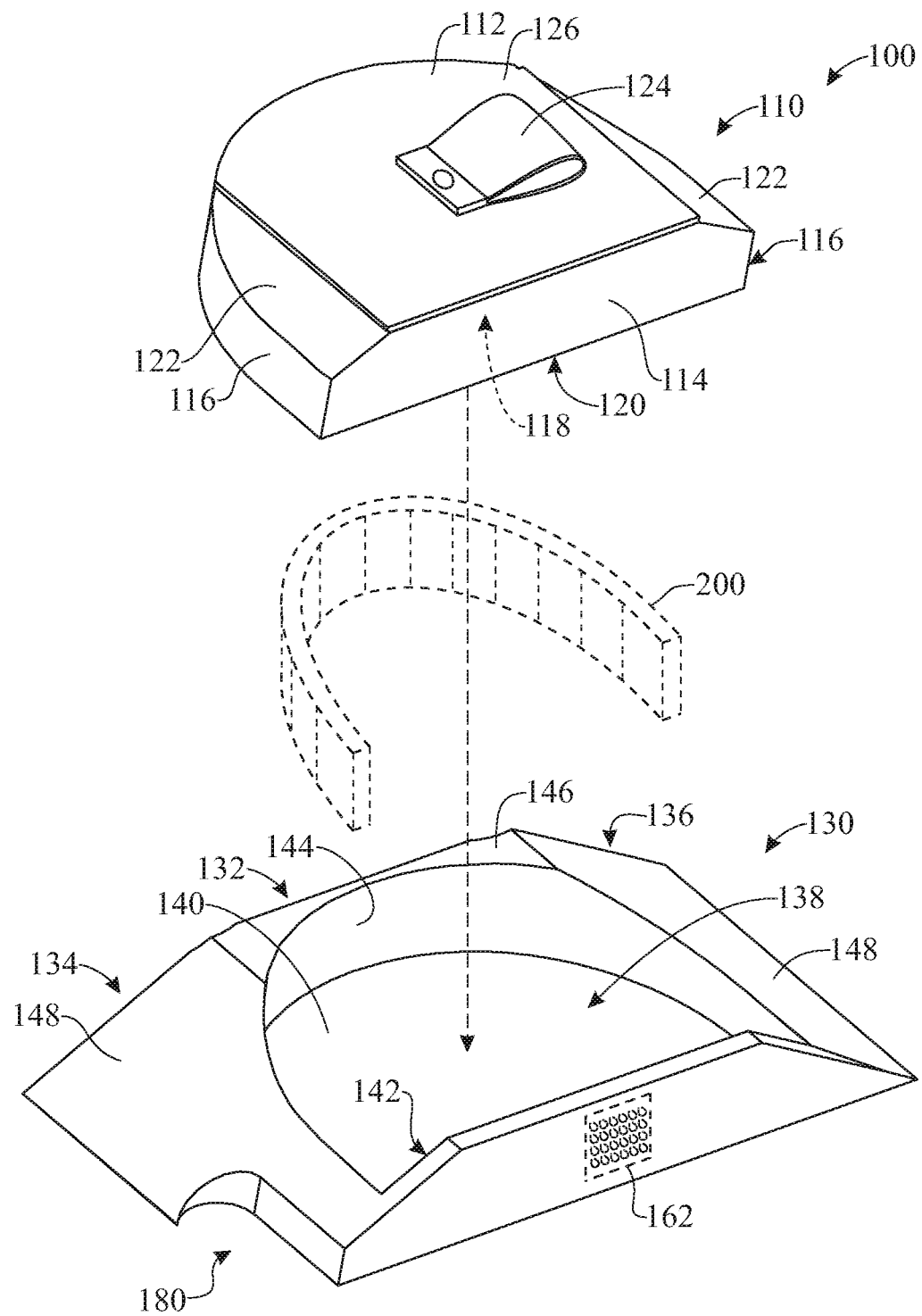
FIG. 2 presents a rear isometric view of the dental retainer casing of FIG. 1, shown exploded, and further schematically depicting an illustrative dental retainer capable of being housed in a space defined between upper and lower receptacles of the dental retainer casing.

The illustrations of FIGS. 1-6 show a dental casing 100 in accordance with an exemplary embodiment of the present invention. With reference initially to FIG. 2, as shown, the dental retainer casing 100 includes an upper receptacle or first casing portion 110 and a lower receptacle or second casing portion 130.

Figure 6:
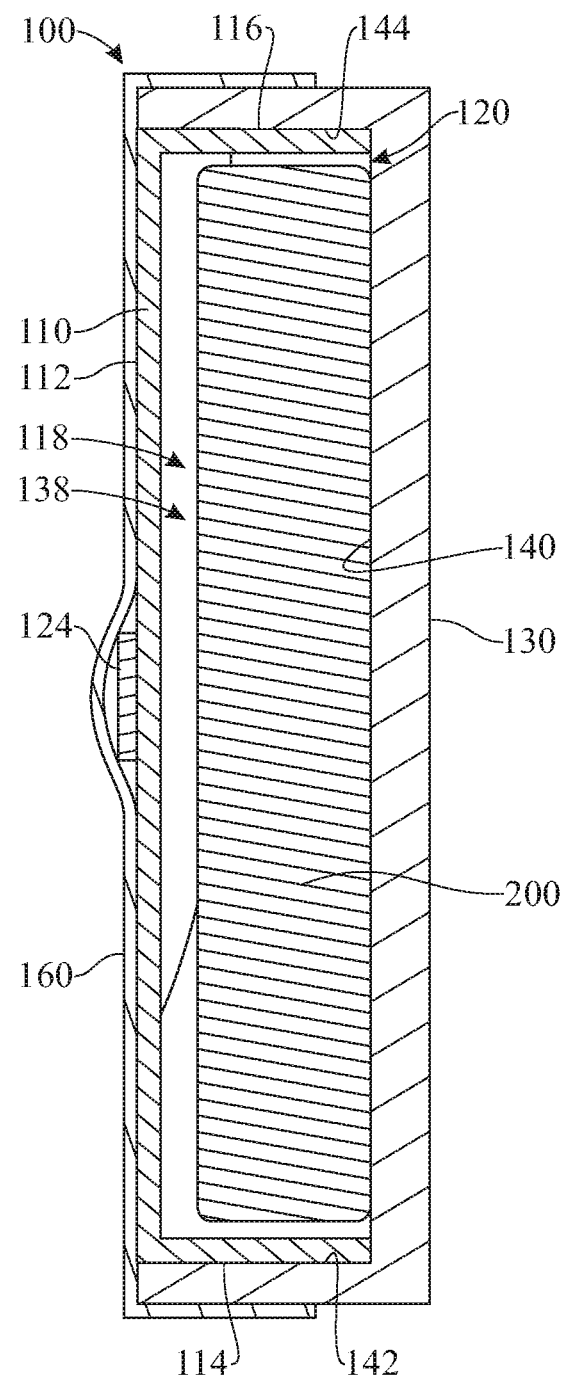
FIG. 6 presents a cross-sectional side elevation view of the dental retainer casing of FIG. 1 containing the dental retainer of FIG. 2 in an internal space defined by the upper and lower receptacles of the dental retainer casing.

The first casing portion 110 comprises a top or outer wall 112, and at least one sidewall 114, 116 extending at least partially from the outer wall 112, such that the outer wall 112 and at least one sidewall 114, 116 define an upper receptacle cavity or inner space 118 configured to receive a retainer 200. In some embodiments, such as the present embodiment, the at least one sidewall 114, 116 may be perpendicular to the outer wall 112. The first casing portion 110 further includes an open end 120 opposite to the outer wall 112 and defined by the at least one sidewall 114, 116. The open end 120 is in spatial communication with the cavity 138, as best shown in FIG. 6.

The second casing portion 130 is generally formed as a solid body which may have a relatively thicker central section 132 and relatively thinner, first and second side sections 134 and 136, respectively. The second casing portion 130 is configured to receive the first casing portion 110, and the retainer 200 housed within the first casing portion 110. More specifically, the second casing portion 130 includes a cavity 138 configured to receive the first casing portion 110. The cavity 138 is defined by a floor 140, and by at least one sidewall 142, 144 formed in the second casing portion 130 and extending from the floor 140. The at least one sidewall 142, 144 may be perpendicular to the floor 140.

The first casing portion 110 is configured, i.e. shaped and sized, to conform to the cavity 138 of the second casing portion 130. More specifically, the first casing portion 110 is configured to conform to the at least one sidewall 142, 144 of the second casing portion 130 which define the cavity 138. In some embodiments, the first casing portion 110 is shaped and sized to snugly fit into the cavity 138, with the shape and size of the at least one sidewall 114, 116 of the first casing portion 110 generally matching the shape and size of the at least one sidewall 142, 144 of the second casing portion 130. In other embodiments, the first casing portion 110 may fit more loosely into the cavity 138 of the second casing portion 130.

In some embodiments, such as the present embodiment, the at least one sidewall 114, 116 of the first casing portion 110 may include a flat, first sidewall 114 and a curved, second sidewall 116 extending from the first sidewall 114. Similarly, the at least one sidewall 142, 144 of the second casing portion 130 may alternatively or additionally include a flat, first sidewall 142 and a curved, second sidewall 144 extending from the first sidewall 142. The flat and curved shapes of the first and second sidewalls, respectively, allow the first casing portion 110 and cavity 138 of the second casing portion 130 to conform to a generally U-shaped retainer 200, as shown in FIG. 2, and contribute to minimize the overall size and weight of the dental retainer casing 100.

As shown in FIG. 1, the first and second casing portions 110 and 130 are configured to adopt an assembled position in which the first casing portion 110 is received within the second casing portion 130. In this assembled position, the first and second casing portions 110 and 130 jointly form a receptacle configured to house the retainer 200. In some embodiments, such as the present embodiment, the joint receptacle formed by the first and second casing portions 110 and 130 may have a generally trapezoidal shape or cross-section. More specifically, the first casing portion 110 may include sloped side surfaces 122 extending from opposite sides of the outer wall 112 to the first and second sidewalls 114 and 116. In turn, the relatively thicker, central section 132 of the second casing portion 130 may include a flat, outer wall 146 and the relatively thinner, first and second side sections 134 and 136 may include a respective sloped side surface 148 extending downwardly at an angle from the outer wall 146. In the assembled position of FIG. 1, the outer wall 146 of the central section 132 of the second casing portion 130 may be flush or approximately flush with the outer wall 112 of the first casing portion 110, and the sloped side surfaces 148 of the first and second side sections 134 and 138 of the second casing portion 130 may be flush or approximately flush with the sloped side surfaces 122 of the first casing portion 110, jointly forming the aforementioned trapezoidal receptacle.

As shown in FIG. 2, the first and second casing portions 110 and 130 of the present embodiment are separable from one another. I.e., the first casing portion 110 may be removed from the cavity 138 of the second casing portion 130 and set aside. This may allow, for instance and without limitation, to use either one of the first casing portion 110 or second casing portion 130 to temporarily support or receive the retainer 200 or other items or objects. Alternative embodiments are contemplated, however, in which the first casing portion 110 and the second casing portion 130 are permanently affixed to each other via a hinge, clasp, or any other mechanism suitable for providing unidirectional or other movement of the first casing portion 110 and the second casing portion 130 respectively allowing access to the cavity 138. In one embodiment, at least one of the first casing portion 110 and the second casing portion 130 is stationary allowing a cap-screw like structure between the first casing portion 110 and the second casing portion 130.

Referring again to FIG. 2, in some embodiments, a loop 124 may be carried by, or extend from, the first casing portion 110. In preferred embodiments, the loop 124 is affixed to the top or outer wall 112 of the first casing portion 110. The loop 124 may be formed as a looped strap or band arranged generally flatly against the outer wall 112 and deformable to receive a finger or other structure, or allow pulling the loop 124 by a user's fingers, to facilitate removing or inserting the first casing portion 110 from or into the second casing portion 130. In one embodiment, the loop 124 may be a panel of fabric or applicable material comprising a leftmost section, a rightmost section, and a looping aperture extending throughout configured to be interlaced and support clipping and other applicable forms of attachment.

The first casing portion 110 may include an affixed panel 126, hick may be adhered to the remainder of the first casing portion 110 and provide the outer wall 112 of the first casing portion 110. The affixed panel 126 may be formed in a different material than the remainder of the first casing portion 110, such as to increase resistance to compression and/or torsion, and/or facilitate a secure attachment of the loop 124. In some embodiments, the affixed panel 126 may be permanently affixed to the remainder of first casing portion 110. In other embodiments, the affixed panel 126 may be removably attached to the remainder of the first casing portion 110, allowing the affixed panel 126 and loop 124 to be removed from the first casing portion 110 and thereby reduce the weight of the first casing portion 110 when not using the loop 124. In one embodiment, the affixed panel 126 may comprise a plurality of slopes and angles on both the anterior and posterior surfaces in order to not only provide the ability to be firmly gripped by the wearer but also support integration with the applicable surface that the affixed panel 126 is being attached to.

The dental retainer casing 100 may further include an attachment mechanism 160, such as a strap, band or the like, configured to disconnectably engage with a designated attachment area 162 on the second casing portion 130 for purposes that will be described hereinafter. The attachment mechanism 160 and the designated attachment area 162 may connect using at least one of a hook-and-loop fastener (as shown), a loop, a clasp, a snap fastener, a zipper, a button or any other type of affixing mechanism suitable for safe adhesion.

The second casing portion 130 may further include a first fastener portion 170, configured to attach to a mating, second fastener portion (not shown) on a supporting structure (e.g., a rear side of a mobile device 210). The first fastener portion 170 and mating, second fastener portion may consist of a hook-and-loop fastener (as shown), a loop, a clasp, a snap fastener, or any other type of affixing mechanism suitable for safe adhesion.

Figure 5:
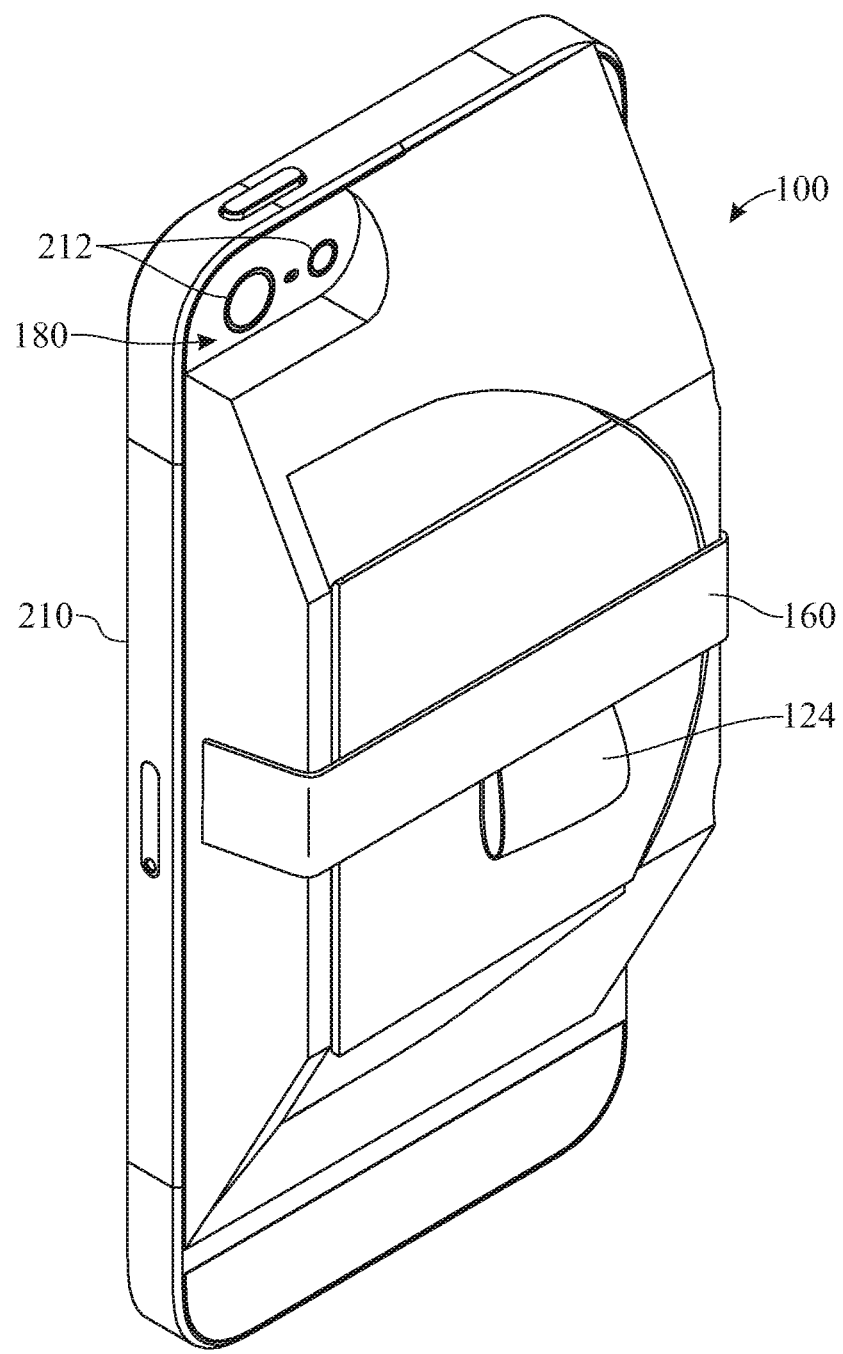
FIG. 5 presents a rear perspective view of the dental retainer casing of FIG. 1 affixed to the rear surface of the client device of FIG. 4 via the affixed panel.

The second casing portion 130 may further include an aperture 180 configured to reveal one or more functional features of the mobile device 210 or other supporting structure to which the dental retainer casing 100 is secured, to allow said one or more functional features to operate normally without interference by the dental retainer casing 100. The aperture 180 may be positioned at any location within the second casing portion 130. For example, if the dental retainer casing 100 is sought to be attached to a mobile device 210, tablet or other electronic device, the location of the aperture 180 may be based on the position of a rear camera lens 212 of the device enabling a posterior camera of the mobile device 210 to be fully functional without suffering from obstruction of the view from the rear camera lens 212 due to the attachment of the dental retainer casing 100, as illustrated in FIG. 5. For instance, the aperture 180 may be located at a corner of the second casing portion 130, as shown.

In operation, as illustrated in FIG. 2, the dental retainer casing 100 houses the retainer 200 via placement of the retainer 200 within the inner space 138 of the first casing portion 110, which in turn is fitted into the cavity 138 of the second casing portion 130, with the first casing portion HO resting on the floor 140 if the second casing portion 130 on top of the retainer 200 and integrating with both the retainer 200 and the second casing portion 130. As a result, the retainer 200 is entirely enclosed by the combination of the first casing portion 110 and the second casing portion 130 in an airtight manner providing safe and sanitary storage. In some applications, the dental retainer casing 100 is not limited to only housing the retainer 200, but may also house other dental equipment or applicable articles.

Figure 3:
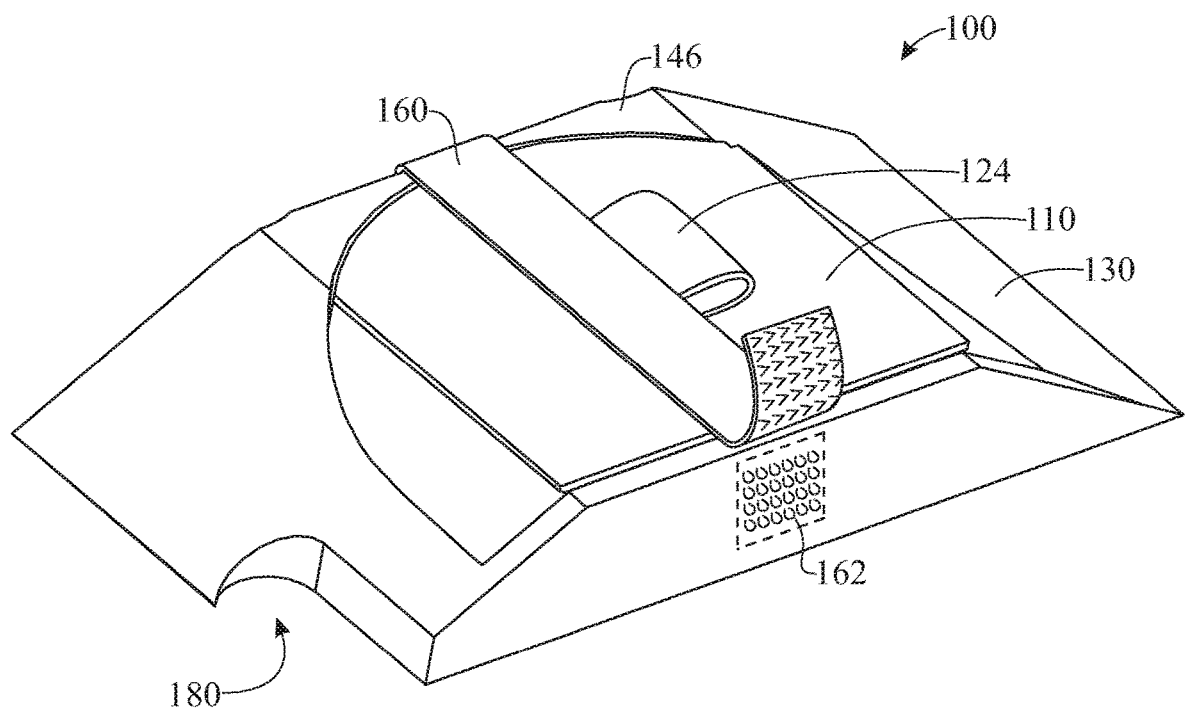
FIG. 3 presents a rear isometric view of the dental retainer casing of FIG. 1, with the attachment mechanism in the disengaged position.

In some embodiments, as shown in FIG. 3, the user may manually extend the attachment mechanism 160 over the first casing portion 110 and across the surface of the outer wall 112 of the first casing portion 110 and engage the attachment mechanism 160 with the designated attachment area 162, in order to achieve the configuration shown in FIG. 1. Attachment of the attachment mechanism 160 to the designated attachment areas 162 further affixes the first casing portion 110 and the second casing portion 130 to each other and contributes to lock the retainer 200 in place, within the inner space 118 and cavity 138.

Figure 4:
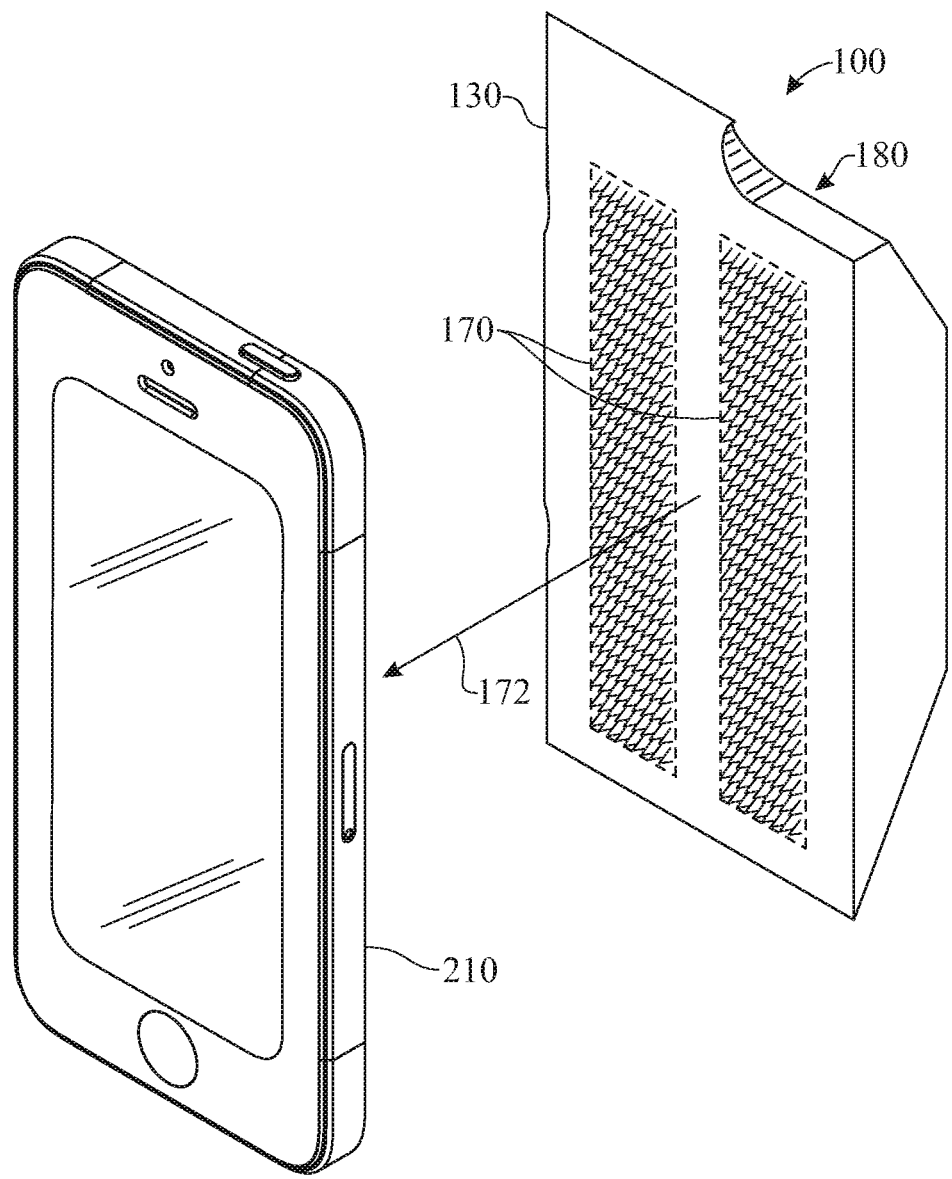
FIG. 4 presents a front perspective view of the dental retainer casing of FIG. 1 being attached to the rear surface of a client device.

Referring now to FIGS. 4-6, the application of the dental retainer casing 100 to a mobile device 210 is illustrated. To apply, the wearer places a posterior surface of the second casing portion 130 (i.e. a surface opposite to the floor 140) comprising the first fastener portion 170 against the mating, second fastener portion on the posterior surface of the mobile device 210 via an attachment movement 172 allowing the second casing portion 130 and the posterior surface of the mobile device to integrate forming an interlocking connection.

In one embodiment, the second casing portion 130 may be affixed to the mobile device 210 via the attachment movement 172, which may be a sliding, twisting, or any other applicable movement suitable for affixing the dental retainer casing 100 to the mobile device 210 in a manner that safely and securely retains the attachment of the dental retainer casing 100 to the mobile device 210. The first fastener portion 170 may be configured to attach to the exterior surface of clothing, fabrics, metal, magnets, or any other applicable surfaces configured to support attachment of the dental retainer casing 100. In one embodiment, the first fastener portion 170 may be configured to support pivoting or rotating respective to the position of the mobile device 210.

The illustration of FIG. 6 shows an embodiment of the dental retainer casing 100 affixed to the mobile device 210 comprising integration of the dental retainer casing 100, the first fastener portion 170, and the posterior surface of the mobile device 210 cooperating to form the interlocking connection. In one embodiment, the interlocking connection may be formed without the first fastener portion 170 in a manner that retains adhesion between the dental retainer casing 100 and the mobile device 210. When the dental retainer casing 100 is securely attached to the posterior surface of the mobile device 210, the dental retainer casing 100 and the posterior surface of the mobile device 210 create a plurality of interlocking connections in order to secure adhesion between the dental retainer casing 100 and the posterior surface of the mobile device 210. Said adhesion is configured to be durable and sustain force, pressure, and impact applied to the dental retainer casino 100.

In an exemplary application, the wearer removes the retainer 200 from their mouth, places the retainer 200 within the cavity 138, and secures the retainer 200 within the cavity 138 by enclosing the retainer 200 within the cavity 138 via placement of the first casing portion 110. The retainer 200 is then securely retained and reinforced via attachment of the attachment mechanism 160 to the designated attachment area 162.

Upon secure housing of the retainer 200, the dental retainer casing 100 is affixed to the posterior surface of the mobile device 210 or any applicable surface configured for attachment by the wearer manually affixing the dental retainer casing 100 to the applicable surface generating the interlocking connection. In one embodiment, upon establishment of the interlocking connection, the dental retainer casing 100 may further comprise a manual or automatic locking mechanism in order to support the interlocking connection and securely retain the adhesion between the dental retainer casing 100 and the mobile device 210.

Upon establishing adhesion between the applicable surface and the dental retainer casing 100 via the first fastener portion 170, the dental retainer casing 100 is configured to be fully integrated with the mobile device 210 functioning not only as an attached housing for the retainer 200, but also as a protective case for the mobile device 210. In one embodiment, the posterior surface of the second casing portion 130 may comprise an insulation mechanism in order to prevent possible damage to the posterior surface of the mobile device 210 acquired by force or impact applied to the coupling of the dental retainer casing 100 and the mobile device 210. The aperture 180 allows the dental retainer casing 100 not to interfere with the rear camera lens 212 of the mobile device 210.

As also shown in FIG. 5, the central section of the dental retainer casing 100 (i.e. the central section 132 of the second casing portion 130) is configured to align with a central section of the electronic device 210 to increase the thickness of the central section of the electronic device 210. This facilitates gripping of the central section of the electronic device 210.

In order to remove the retainer from the dental retainer casing 100, the wearer must manually detach the dental retainer casing 100 from the mobile device 210, disengage the attachment between the designated attachment area 162 and the attachment mechanism 160, and eliminate the coupling between the first casing portion 110 and the second casing portion 130 allowing entry into the cavity 138.

In alternative embodiments of the invention, the first casing portion 110 and the second casing portion 130 are not limited to a specific structure that supports integration, and access to the cavity 138 may be acquired via movements such as twisting, sliding, or any other applicable movement subject to the relationship and integration between the first casing portion 110 and the second casing portion 130. For example, the first casing portion 110 may be configured to connect to the second casing portion 130 in a screw-like manner via a twisting motion by the wearer (not shown). In another example, the first casing portion 110 may be configured to disconnect from the second casing portion 130 via a sliding motion that results in the exposure of the cavity 138.

In one embodiment, the dental retainer casing 100 and its components may be made up of Acrylonitrile Butadiene Styrene (ABS) plastic, polycarbonate plastic, or any other alloys or materials suitable for safely and sanitarily storing a dental retainer. In a preferred embodiment, the components used to make up the dental retainer casing 100 are free of bisphenol A (BPA).

In one embodiment, the first casing portion 110 and the second casing portion 130 may comprise a plurality of moldings and ridges configured to support integration of the structures and grooves associated with the retainer 200. In one embodiment, both the first casing portion 110 and the second casing portion 130 may comprise a plurality of cavities including said moldings and ridges intended to align and integrate with the retainer 200 allowing the dental retainer casing 100 to hold the retainer 200 in place preventing potential damage due to lack of retention.

The disclosed invention allows the following advantages over the prior art: safe, secure, and sanitary housing of dental retainers in a manner that enables the wearer to attach the housed retainer to a surface such as a mobile device via integrate-able and interlocking connections. The attachment of the dental retainer casing to surfaces such as the back of a mobile device allows the wearer to not have to deal with the burden of keeping track of or accidentally discarding their retainer and/or retainer case due the convenient and secure affixing that promotes portability.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A dental retainer casing comprising:
a first casing portion, comprising a set of walls defining an inner space configured to receive a dental retainer, and an open end providing access to the inner space;
a second casing portion, comprising a cavity configured to at least partially receive the first casing portion;
wherein the first and second casing portions are movable relative to one another and configured to selectively adopt:
a first configuration, in which the first and second casing portions are moved away from one another thereby allowing access to the inner space of the first casing portion for insertion or removal of a dental retainer into or from the inner space, and
a second configuration, in which the first and second casing portions are assembled onto one another such that the first casing portion is at least partially received within the cavity of the second casing portion and the open end of the first casing portion is closed by the second casing portion, thereby enclosing the inner space of the first casing portion.

2. The dental retainer casing of claim 1, wherein the cavity of the second casing portion is configured to receive the first casing portion such that an outer surface of the first casing portion is flush with an outer surface of the second casing portion.

3. The dental retainer casing of claim 1, wherein the set of walls of the first casing portion comprises a flat sidewall and a curved sidewall extending from opposite ends of the flat sidewall, and further wherein the inner space is configured to conform to a U-shaped dental retainer.

4. The dental retainer casing of claim 3, wherein the cavity of the second casing portion is defined by a flat sidewall and a curved sidewall, which are shaped and sized to conform to the flat sidewall and curved sidewall of the first casing portion, respectively.

5. The dental retainer casing of claim 4, wherein the flat sidewalls of the first and second casing portions contact one another and the curved sidewalls of the first and second casing portions contact one another when the first and second casing portions are arranged in the second configuration.

6. The dental retainer casing of claim 1, wherein the first casing portion in the second configuration is snugly fitted into the cavity of the second casing portion.

7. The dental retainer casing of claim 1, further comprising a loop attached to and extending from an outer wall of the first casing portion, wherein the outer wall is opposite to the open end.

8. The dental retainer casing of claim 7, wherein the first casing portion further comprises an affixed panel carrying the loop, wherein the affixed panel is attached to a remainder of the first casing portion.

9. The dental retainer casing of claim 8, wherein the affixed panel is made of a different material than the remainder of the first casing portion.

10. The dental retainer casing of claim 1, further comprising an attachment mechanism configured to secure the first casing portion to the second casing portion in the second configuration.

11. The dental retainer casing of claim 10, wherein the attachment mechanism comprises a strap configured to extend over and across the first casing portion and attach to the second casing portion in the second configuration.

12. The dental retainer casing of claim 1, wherein the first and second casing portions form a receptacle having a central section and first and second side sections arranged on opposite sides of the central section, wherein the central section is thicker than the first and second side sections.

13. The dental retainer casing of claim 12, further comprising a fastener portion configured to attach the dental retainer casing to a second fastener portion comprised in an electronic device, wherein the central section of the dental retainer casing is configured to align with a central section of the electronic device to increase a thickness of said central section of the electronic device facilitating gripping of the central section of the electronic device.

14. The dental retainer casing of claim 12, further comprising a loop attached to and extending from an outer wall of the first casing portion at the central section of the dental retainer casing, wherein the outer wall is opposite to the open end.

15. The dental retainer casing of claim 12, wherein the first and second casing portions form a trapezoidal receptacle when arranged in the second configuration.

16. The dental retainer casing of claim 1, further comprising a fastener portion configured to attach the dental retainer casing to a second fastener portion carried by an external structure.

17. The dental retainer casing of claim 1, further comprising a fastener portion configured to attach the dental retainer casing to a second fastener portion comprised in an electronic device.

18. The dental retainer casing of claim 17, further comprising at least one aperture configured to align with a functional feature of the electronic device.

19. A dental retainer casing comprising:
a first casing portion, comprising a set of walls defining an inner space configured to receive a dental retainer, and an open end providing access to the inner space;
a second casing portion, comprising a cavity configured to at least partially receive the first casing portion;
wherein the first and second casing portions are movable relative to or another and configured to selectively adopt:
  a first configuration, in which the first and second casing portions are moved away from one another thereby allowing access to the inner space of the first casing portion for insertion or removal of a dental retainer into or from the inner space; and
  a second configuration, in which the first and second casing portions are assembled onto one another such that the first casing portion is snugly received within the cavity of the second casing portion and the open end of the first casing portion is closed by the second casing portion, thereby enclosing the inner space of the first casing portion, and further in which an outer surface of the first casing portion is flush with an outer surface of the second casing portion.

20. A dental retainer casing comprising:
a first casing portion, comprising a set of walls defining an inner space configured to receive a dental retainer, and an open end providing access to the inner space;
a second casing portion, comprising a cavity configured to at least partially receive the first casing portion;
wherein the first and second casing portions are movable relative to one another and configured to selectively adopt:
  a first configuration, in which the first and second casing portions are moved away from one another thereby allowing access to the inner space of the first casing portion for insertion or removal of a dental retainer into or from the inner space, and
  a second configuration, in which the first and second casing portions are assembled onto one another forming a receptacle having a relatively thicker central section, with the first casing portion snugly received within the cavity of the second casing portion and the open end of the first casing portion closed by the second casing portion, thereby enclosing the inner space of the first casing portion, and further in which an outer surface of the first casing portion is flush with an outer surface of the second casing portion; and wherein
the dental retainer casing in the second configuration is configured to attach to an electronic device such that the central section of the dental retainer casing is aligned with a central section of the electronic device.

* * * * *